Feb. 24, 1959 C. A. BONNER 2,874,644
MOVABLE TABLE RUN-OUT AND RETURN APPARATUS
Filed Sept. 7, 1954 7 Sheets-Sheet 3
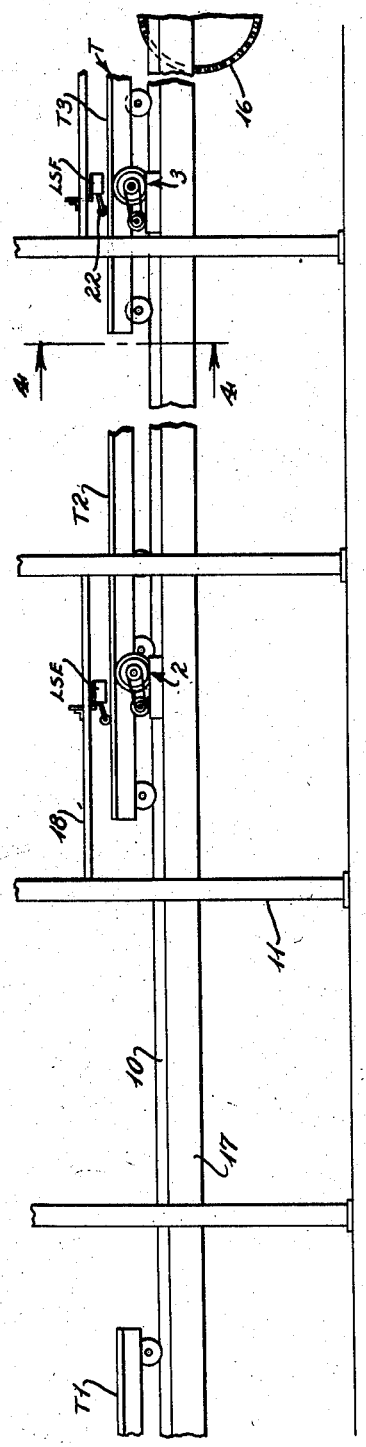
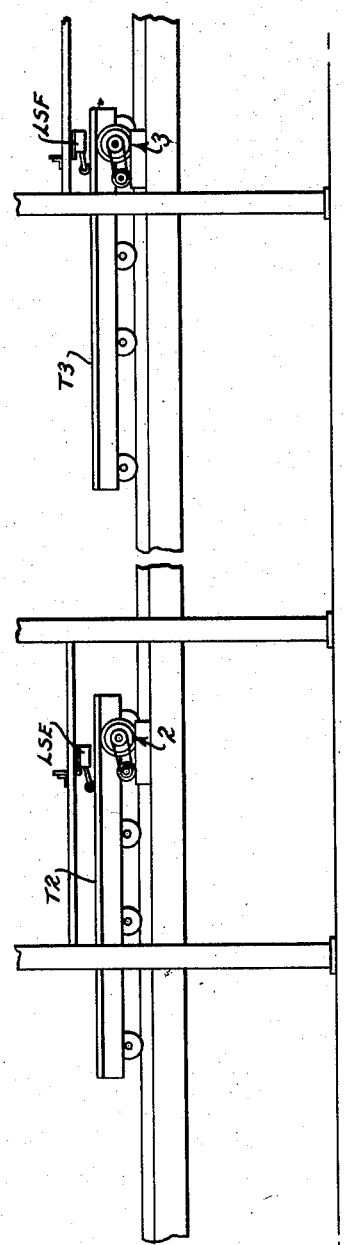
INVENTOR
Charles A. Bonner

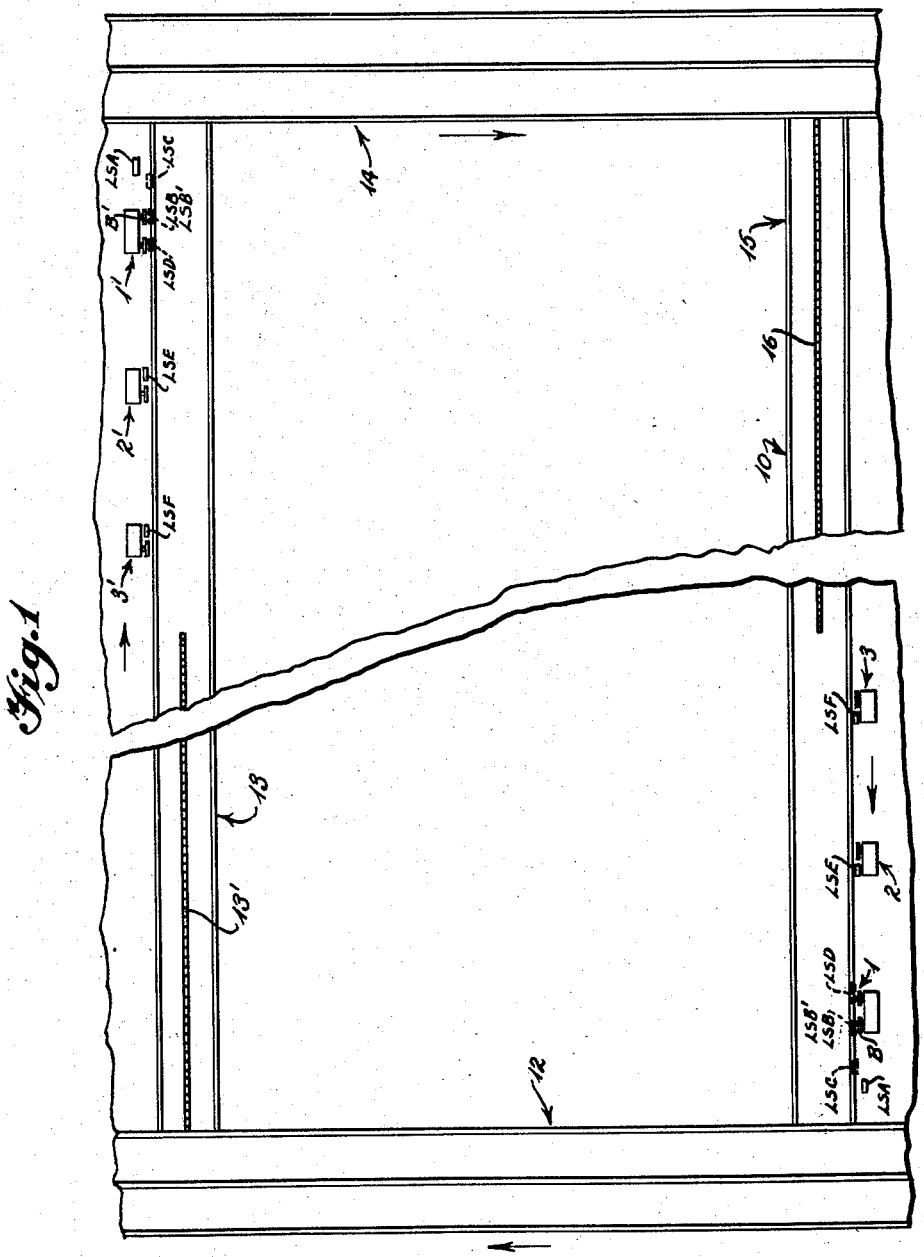

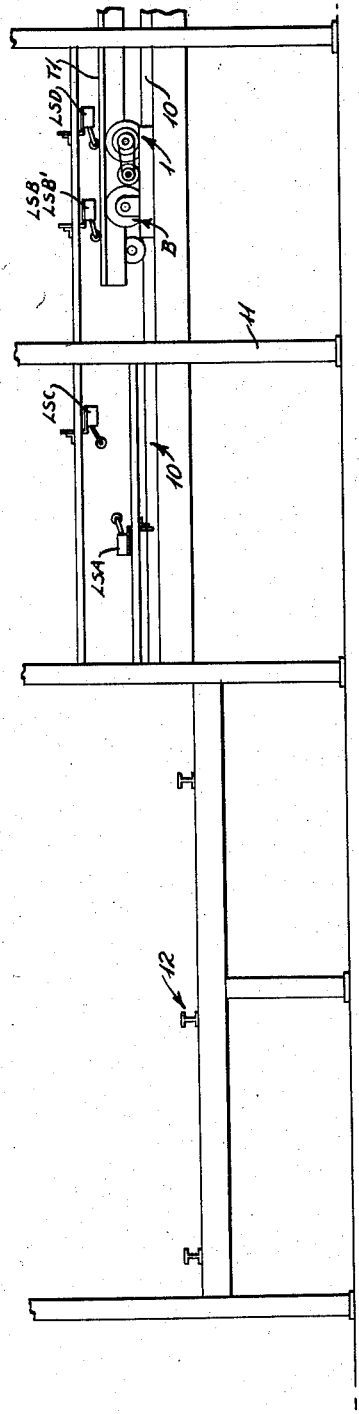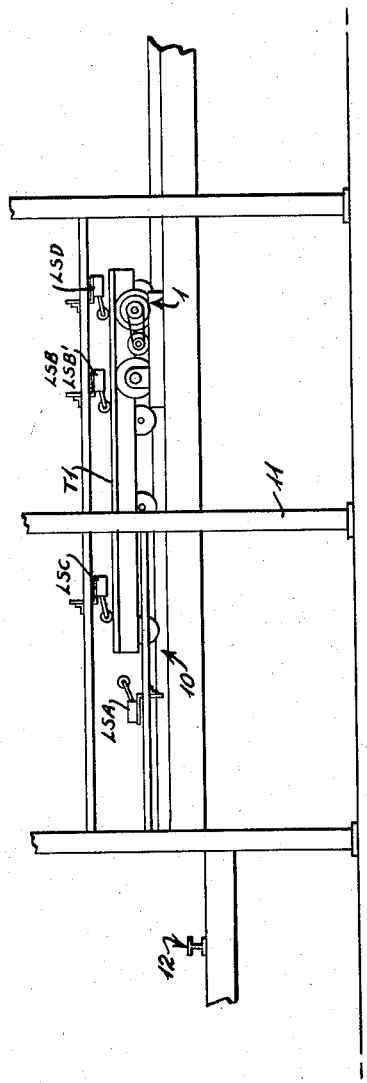

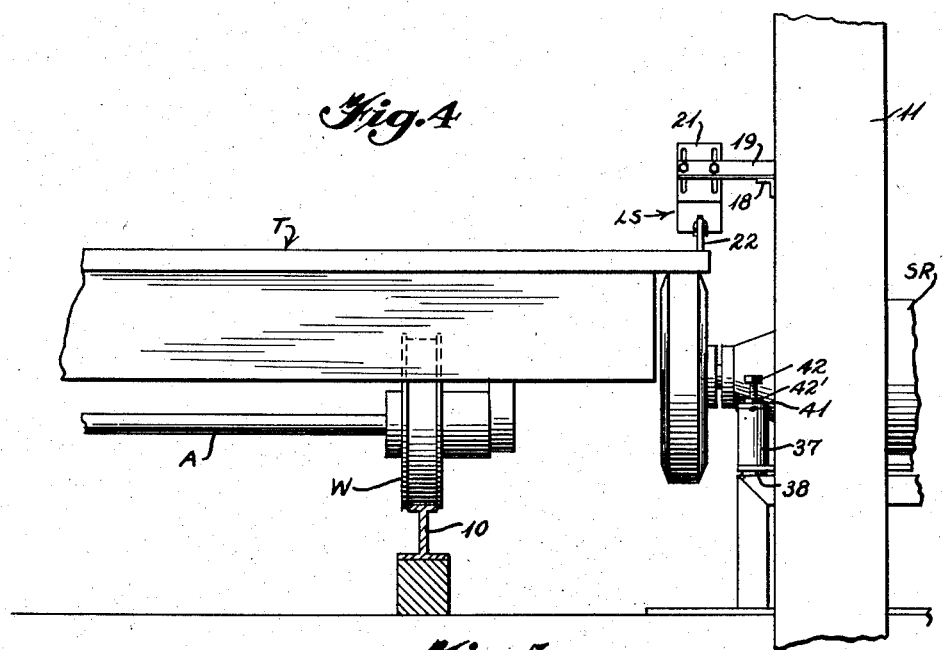
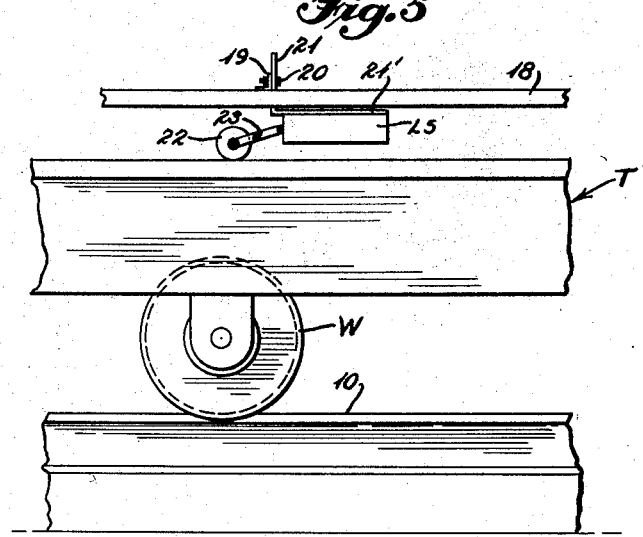

Feb. 24, 1959  C. A. BONNER  2,874,644
MOVABLE TABLE RUN-OUT AND RETURN APPARATUS
Filed Sept. 7, 1954  7 Sheets-Sheet 5

INVENTOR
Charles A. Bonner
BY
ATTORNEY

Feb. 24, 1959 — C. A. BONNER — 2,874,644
MOVABLE TABLE RUN-OUT AND RETURN APPARATUS
Filed Sept. 7, 1954

INVENTOR
Charles A. Bonner
BY Oscar L. Spencer
ATTORNEY

Feb. 24, 1959     C. A. BONNER     2,874,644
MOVABLE TABLE RUN-OUT AND RETURN APPARATUS
Filed Sept. 7, 1954     7 Sheets-Sheet 7
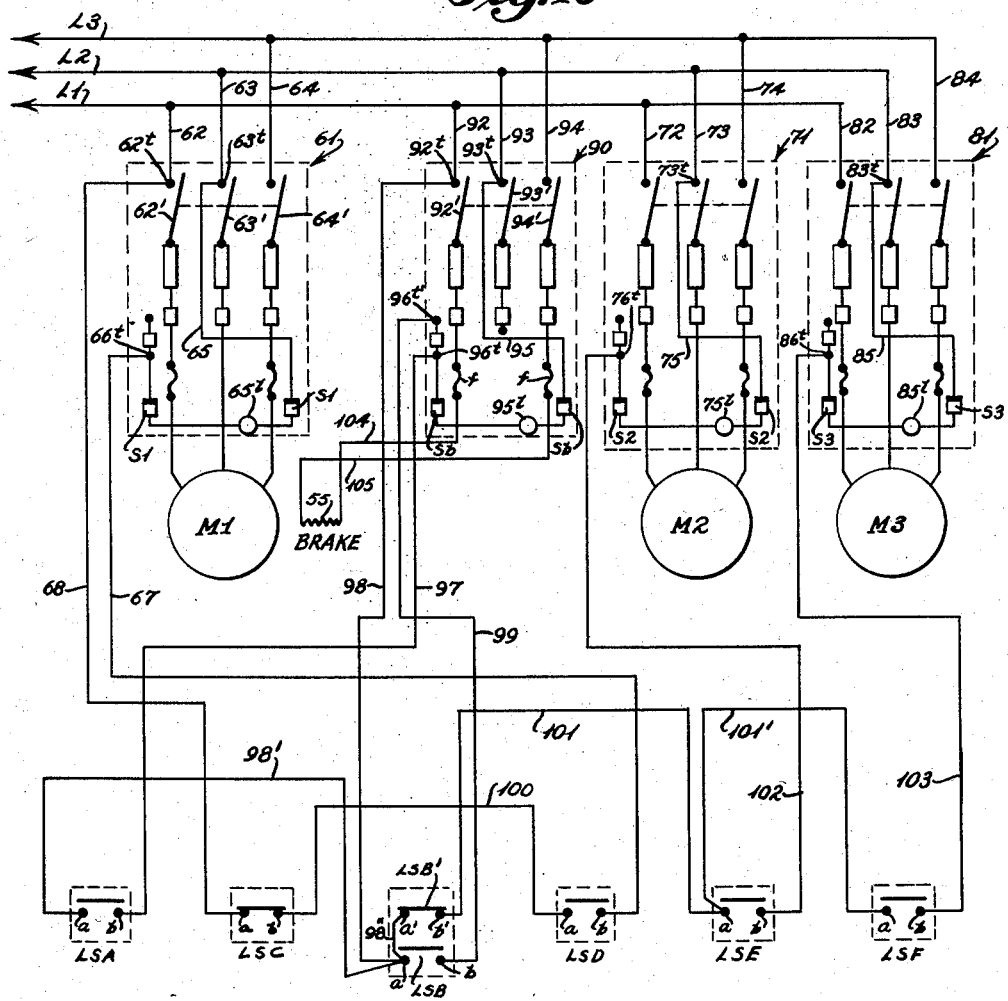
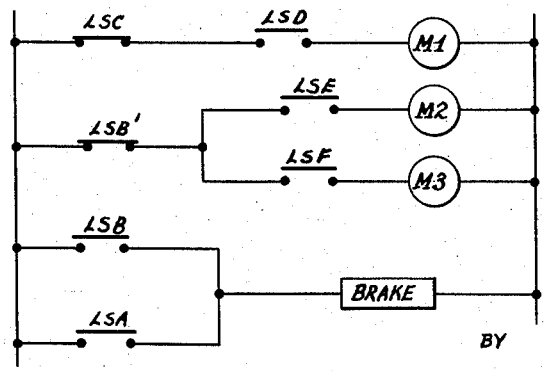
INVENTOR
Charles A. Bonner
BY
ATTORNEY

# United States Patent Office 2,874,644
Patented Feb. 24, 1959

2,874,644

MOVABLE TABLE RUN-OUT AND RETURN APPARATUS

Charles A. Bonner, Ford City, Pa., assignor to Pittsburgh Plate Glass Company, Allegheny County, Pa., a corporation of Pennsylvania Application September 7, 1954, Serial No. 454,433

4 Claims. (Cl. 104—48)

My invention is directed to drive mechanism for successively moving tables or cars on tracks and particularly movable tables after they leave the glass grinding and polishing line.

In the manufacture of plate glass and sheet glass of certain kinds, the plates or sheets are placed on movable tables which are moved along on tracks under grinding and polishing stations by means of an endless chain positioned under the movable tables. In order to utilize the tables again they are moved on down the track at the end of the endless chain by means of butting one table against the other. At the end of the track there is a transverse transfer track and transfer locomotive which moves the tables across to a return track to bring them back so that they may be used again in the grinding and polishing line. In order to carry out this method of handling the tables, it is necessary that a number of tables be used such that they abut one another between the end of the endless belt and the transfer track in order that they may be moved along as each table comes off the endless chain. So, also, by this method of returning the tables to the grinding and polishing line, the tables bump against each other in their movement and become damaged.

It is an object of my invention to provide drive mechanism so placed along the track at the end of the endless chain that the tables are run-out by this drive mechanism in successive steps without having the tables bump each other and without requiring that the track be totally filled with abutting tables.

A further object of my invention is to also provide spaced apart drive mechanism along the return track to bring the tables back to the grinding and polishing end of the building housing the operation.

Another object of my invention is to provide a braking or retardation mechanism for interrupting the movement of the tables as necessary.

A further object of my invention is to provide control mechanism for the driving units such that unless the track is sufficiently clear ahead a car or table will not be moved.

A still further object of my invention is to provide a stationary positioned drive unit having a rotating traction wheel which is positioned in the path of the movable table and such that it will contact same to move it forward when the traction wheel is rotated in contact with the table.

Another object of my invention is to provide a drive unit for a table or car having a vertically adjustable resilient mounting so that the traction wheel thereof may be brought into contact with the driving surface on the table being moved.

A still further object of my invention is to provide control apparatus wherein a transfer locomotive may enter the run-out track and automatically release the brake mechanism acting on the outermost car or table with co-operating brake control mechanism which is operated by such a table to hold the brake released while the table is being moved out of its end position on the track.

Still further objects and the entire scope of applicability of the present invention will become apparent from the detailed description given hereinafter: It should be understood, however, that the detailed description and specific examples are given by way of illustration only, and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which:

Fig. 1 is a plan view of a complete track system within a building in a grinding and polishing glass line;

Fig. 2 is a side elevation showing the end of the transfer track and the extreme end of the run-out track with a table approaching the end of the run-out track;

Fig. 2a is a side elevation of the right-hand end of the run-out track of Fig. 2 with additional tables thereon over my table drive mechanisms;

Fig. 3 is a side elevation similar to Fig. 2 showing the table of Fig. 2 having moved out farther toward the left and the end of the run-out or return track;

Fig. 3a is a side elevation of the track section in Fig. 2a showing the tables having advanced farther toward the left or the end of the return track;

Fig. 4 is a fragmentary vertical cross section along line 4—4 of Fig. 2a;

Fig. 5 is a side view of Fig. 4 showing the mounting of a limit switch above the table;

Fig. 10 is a circuit diagram showing the control for three drive units and the braking mechanism along with the limit switches for the tracks and tables shown in Figs. 1–3a; and Fig. 11 is a simplified circuit diagram of the control of the motors for each of the drive units and the brake shown in Fig. 10 showing the normal position of the limit switches.

Throughout the description like reference numerals refer to similar parts in the various figures of the drawings.

Figure 6:
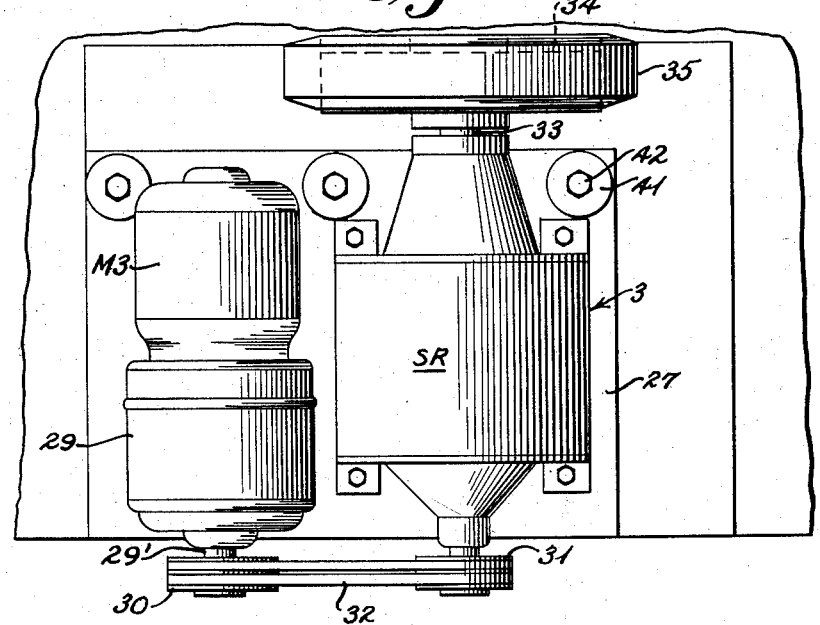
Fig. 6 is a plan view of a table run-out drive mechanism.

In Fig. 1 there is shown a plan view of the floor of a building having typical trackage for the tables which carry the glass in a grinding and polishing operation along with the transfer trackage for bringing the tables back to the grinding and polishing line. For example, at the bottom of the figure, there is shown a pair of tracks 10 which are mounted on spaced columns 11, see Figs. 2–3a, in a position above the floor of the building. At the left-hand end of the building, as shown in Fig. 1, is a transversely extending transfer track 12 having three rails as shown in Fig. 2 which are mounted on columns positioning the rails slightly below the level of track 10. A transfer locomotive (not shown) runs on this track 12 as well as track 10. The use of transfer locomotives is customary as will be seen by reference to assignee's U. S. Patent 1,686,742. Still referring to Fig. 1 a return track 13 is positioned along the other side of the building parallel to track 10, and it transfers the cars to a similar track 14 similar to track 12 located at the opposite end of the building so that the cars may be returned to the grinding and polishing line generally indicated at 15 on track 10.

An endless chain 16 which is power-driven is positioned between the rails of track 10 such as shown in Figs. 1 and 2a, and by suitable hook means (not shown) the tables, as generally indicated at T in Fig. 2a, are moved along the right half of track 10. The tables T are mounted on axles A, see Fig. 4, on which are mounted wheels W that run on the rails of the track 10.

In Figs. 2 and 2a, with Fig. 2a placed at the right of Fig. 2, there is shown starting at the left-hand end of track 10, tables T1, T2, and T3. The rails of track 10 are mounted on beams 17 secured to the vertical columns 11. Also mounted in suitable spaced relation along the beams 17 and adjacent the tracks 10 are drive units generally indicated at 1, 2, and 3. Drive unit 1 has mounted adjacent it and on the same platform a brake or retardation mechanism generally indicated at B. Mounted above the tables T and between adjacent columns 11 are longitudinal angle bars 18 which support in a vertical adjusted position above the tables certain limit switches generally designated LS.

Referring to Figures 4 and 5 a transverse support angle bracket 19 is welded to angle bar 18 and suitable bolts 20 extending through angle bar 19 support a slotted angle plate 21 to which the limit switch LS is attached along the horizontal flange 21'. Typical limit switch LS, see Fig. 5, has a feeler wheel 22 supported on a movable contact arm bracket 23 such that it will be moved by a table pushing thereunder.

Figure 7:
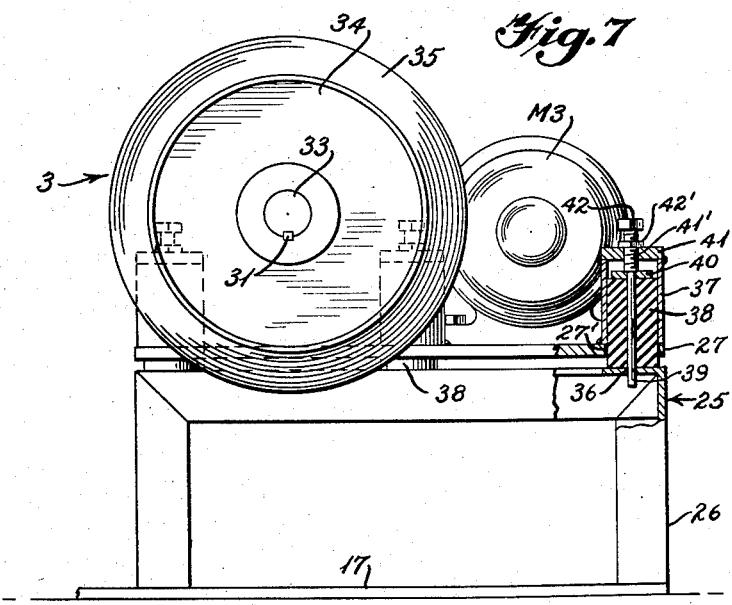
Fig. 7 is an end view as viewed from the top of Fig. 6 of the drive unit showing in section one of the resilient vertically adjustable mountings.

Referring now to Figures 6 and 7, a typical drive unit generally indicated at 3 will be described. An angle iron framework generally indicated at 25 having vertical legs 26 is supported on a horizontal mounting plate 17 attached to the vertical columns 11. Platform 25 has mounted thereon a horizontal plate 27 which is spaced therefrom by rubber shims 28, see Fig. 9a. Suitable capscrews 47', see Fig. 9a, hold the plates 27 and 47 in engagement with their platforms 25 and 45, respectively. Mounted on the horizontal plate 27, as shown in Fig. 7, is an electric motor M3 which is combined with and drives a fluid-drive unit 29 having a V-belt pulley 30 attached to the driveshaft 29' thereof. Also mounted on plate 27 is a speed reducer SR having a V-belt drive pulley 31 leading to the drive pulley 30 on the fluid drive unit 29. The speed reducer SR has a drive shaft 33 extending out the opposite end from the drive pulley 31 and on it is keyed, as at 33', a driven traction wheel 34. Fitted over the wheel 34 is a hard rubber tire 35 which is in frictional driving contact, see Fig. 4, with the underneath ledge of the table T. Mounting plate 27 is vertically adjustable along the edge adjacent that traction wheel 34 as will be explained. In Figures 6 and 7 it will be noted that the top of frame 25 has formed therein spaced apart apertures 36 along the ledge which is adjacent the traction wheel 34. In plate 27 above the apertures 36 are apertures 27' to accommodate vertical rubber spring members 38 to be described. Welded to plate 27 in concentric relation about apertures 27' are vertically extending tubular elements 37. Mounted in each tubular element 37 is a cylindrical rubber spring 38 having a vertical aperture therethrough which receives a securing pin 39 having affixed to its top end a top plate 40 which rests on the top of the rubber cylindrical spring 38. Securing pin 39 extends through aperture 27' and aperture 36 in frame 25. Springs 38 are of sufficient length that they rest on the top of frame 25 and extend upward within spaced relation of the top of the enclosing circular tube 37. Secured to the top of tube 37, as by welding, is a washer-like plate 41 having a threaded central aperture 41' which receives a threaded capscrew 42, the bottom end of which rides against the top 40 of the pin 39. Thus, by adjusting the capscrews 42 in each of the spring mountings, the plate 27 may be adjusted vertically. Capscrew 42 is held in adjusted poistion by the locknut 42'. Further, the cylindrical rubber spring element 38 provides a resilient mounting for the front edge or wheel engaging edge of the whole drive unit. As the hard rubber or composition tire 35 on wheel 34 wears away, screws 42 may be adjusted to raise the unit to compensate for the wear of the tire 35.

Figure 8:
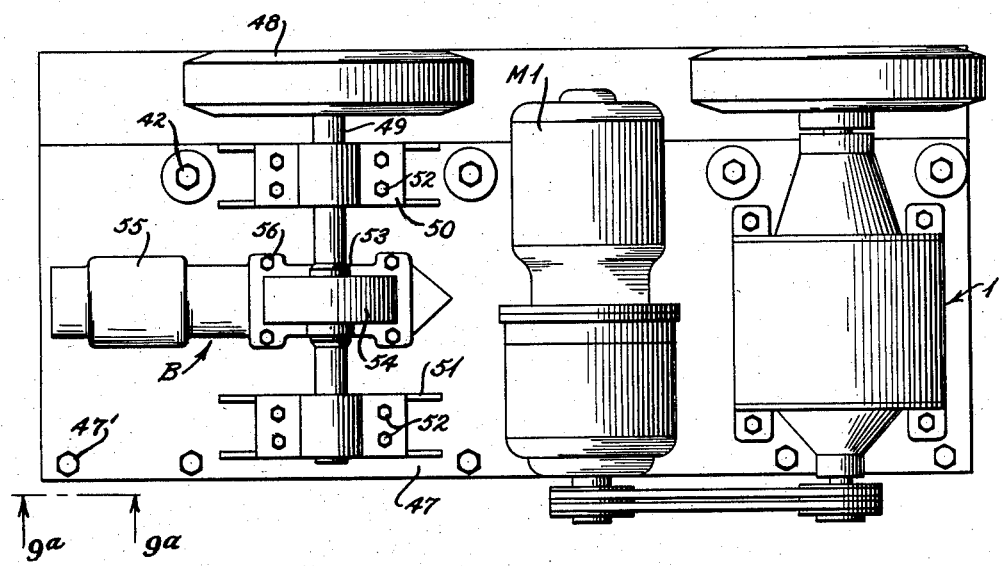
Fig. 8 is a top plan view of a combined drive unit and brake unit.
Figure 9:
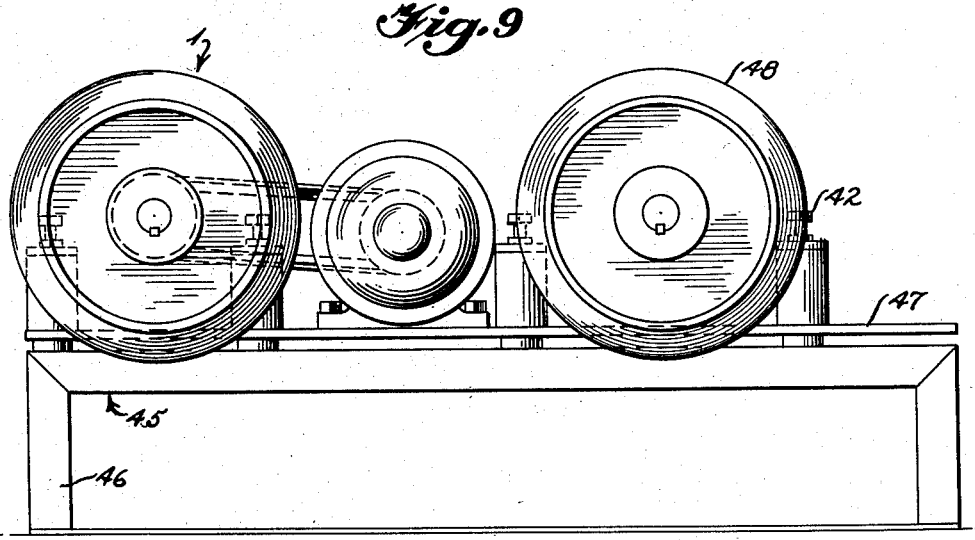
Fig. 9 is a side elevational view as viewed at the top of Fig. 8 of the combined mounting of a drive unit and braking unit.
Figure 9A:
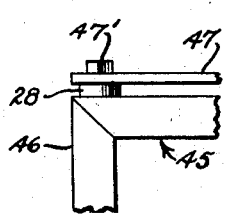
Fig. 9a is a fragmentary showing of the support mounting for the platform of the combined drive and brake unit as viewed along line 9a—9a of Fig. 8.

In Figs. 8 and 9 there is shown a combined mounting of a drive unit and brake or retarding mechanism for the tables. A mounting plate 47 similar to mounting plate 27 is supported on a framework 45 similar to the framework 25 in Figs. 6 and 7. A drive unit generally indicated at 1 is mounted on this plate 47 and adjacent thereto is a brake unit generally indicated at B. Drive unit 1 is like drive unit 3 described above. Brake unit B consists of a traction wheel 48 of similar size to the wheel 34—35 on the drive units 1, 2, and 3. Traction wheel 48 is mounted on a shaft 49 supported in spaced apart pillow bearings at 50 and 51 bolted to plate 47 as by the bolts 52. Shaft 49 is formed with a hub 53 at its center to which is keyed a brake wheel 54. An electromagnetic brake element 55 is associated with brake wheel 54 and is bolted to the plate 47 as by bolts 56. This brake 55 is shown in the circuit diagram in Fig. 10 adjacent the motor M1 for the drive unit No. 1.

In Fig. 10 there is shown a circuit diagram indicating the powerlines L1, L2, and L3, to which are respectively connected the starter boxes 61, 71, and 81, and a switch 90 for the brake 55. Each of the motors are preferably 550 volt, 3-phase and 60 cycles. Each of the starter boxes and the brake switch are connected respectively to the three lines L1, L2, and L3, as for example, for starter box 61 connectors 62, 63, and 64.

From lines L1 and L2 in each of the starters, as at terminal 62t and 63t for starter 61, power takeoff lines lead to the solenoid for each of the starters as indicated at S1. From terminal 63t on starter 61 a power lead 65 passes through the solenoid S1 to indicator light 65¹ to the terminal 66t. A connector 67 leads from terminal 66t to one of the terminals b on limit switch LSD. The other terminal a of LSD is connected by connector 100 to terminal b of LSC, while terminal a of LSC is connected by connector 68 to the terminal 62t connected to powerline L1 by connector 62. It will be noted that limit switches LSC and LSD are connected in series. Connector 98 is attached at its upper end to terminal 92t on the brake switch 90 and it connects to terminal a of limit switch LSB and also by connector 98' to terminal a of limit switch LSA. The other terminal b of LSA is connected by connector 97 to terminal 96t on the brake switch 90. Terminal b of limit switch LSB is connected through connector 99 to a second terminal 96t' on the brake switch 90, which ties it in to the powerline L2 through the connector 95 leading to terminal 93t. A jumper 98" connects terminal a of switch LSB to terminal a' of limit switch LSB'. The other terminal b' of LSB' is connected by conductor 101 to terminal a of limit switch LSE and thence by connector 101' to limit switch terminal a of switch LSF. Terminal b of switch LSE is connected by conductor 102 to terminal 76t of starter 71 for motor M2. So also the other terminal b of limit switch LSF is connected by conductor 103 to terminal 86t of starter switch 81. In Fig. 11 there is shown in simple form the normal position of the various limit switch contacts and also their circuit tie-in with the motors and the brake which they control.

A chart of each limit switch, its contact position, and its operation is set forth as follows:

| L. S. | Contact | Operation |
|---|---|---|
| A | N. O.[1] | Releases brake when actuated by locomotive. |
| B | N. O. | Keeps brake released while car is pulled out. |
| B' | N. C.[2] | Stops motors No. 2 and 3. |
| C | N. O. | Stops motor No. 1. |
| D | N. O. | Starts motor No. 1. |
| E | N. O. | Starts motor No. 2. |
| F | N. O. | Starts motor No. 3. |

[1] Normally open.
[2] Normally closed.

Referring to Figs. 2 and 2a with Fig. 2a positioned to the right of Fig. 2 and to Figs. 3 and 3a with Fig. 3a positioned to the right of Fig. 3, the progressive operation and successive movement of movable tables T1, T2, and T3 will be explained.

Initially car T1 progressed down track 10 from the right-hand of Fig. 1 toward the left under the influence of the endless chain 16 and was pushed under limit switch LSF so that roller 22 controlling the switch raised the switch arm 23 and closed the contact of switch LSF between contacts a and b, thus completing a circuit to the solenoid operating starter switch 81 for motor M3. This circuit includes starting with powerline L1, terminal 92t, connector 98, the a contacts of switch LSB and LSB', through switch LSB', conductor 101, conductor 101', now closed contact LSF, contact b on LSF, conductor 103 to terminal 86t on switch box 81, conductor 85 to terminal 83t and thence by conductor 83 to line L2. Thus power is provided to the solenoid S3 to start motor M3 and drive unit 3 wherein the typical traction wheel 34—35, see Fig. 6, contacts the underneath side of the table which at that time is T1 and moves it to the left. The drive unit 1 is so geared that the traction wheel 34—35 turns it about 12 R. P. M. and the wheel being about 24 inches in outside diameter affords a tangential speed of a little over 700 inches per minute. This drives car T1 to the left under limit switch LSE where it closes this limit switch and in turn closes the starter switch 71 starting motor M2, and the table T1 is then propelled farther to the left, however, at no time is a car contacting any two limit switches as the length of each car is shorter than the spacing between limit switches. At each station where the car leaves the limit switch, the limit switch opens to its normal open position and the respective drive unit motor and drive unit comes to a stop. Continuing with Fig. 2a, table T1 has now approached and is under limit switch LSD, and it is closed so that a circuit is completed to starter switch 61 and motor M1 is energized to drive table T1 farther to the left, as shown in Fig. 3. As table T1 moves to the left it first moves over brake wheel B which is retarded and this slows down the car movement. Then the table comes under limit switch LSB which is normally open and now is closed and completes the circuit from line 98 and terminal 92t through conductor 99 to terminal 96t', conductor 95 through the solenoid Sb and to terminal 93t back to the other side of the powerline, namely, L2, whereupon the brake switch 90 closes and energy is placed on brake 55 to release same. Brake wheel or retardation wheel 48, see Fig. 8, rotates and permits the table T1, see Fig. 2, to move slowly and farther to the left to the position in Fig. 3. In Fig. 3 table T1 comes under the limit switch LSC which is connected in series with limit switch LSD to motor M1 and is normally closed but is opened upon contact with the table T1. Upon this happening, motor M1 is deenergized whereupon the movement of table T1 to the left is stopped. Referring to Fig. 11, even though switch LSD is closed with the table T1 in the position shown in Fig. 3, switch LSC in series therewith is open and no energy flows to motor M1.

Referring to Figs. 10 and 11 and Fig. 3, it will be noted that limit switch LSA is positioned in spaced relation to the left of car T1 and that limit switch LSA is in parallel circuit with the brake switch LSB. When the transfer locomotive (not shown) moves from track 12 onto track 10, it closes limit switch LSA and completes a circuit to the brake switch 90 thereby releasing brake 55. This is necessary since the table T1 may have become stalled to the right of the switch LSD in Fig. 3 and the locomotive must move in past the brake B to pick up the table. As the table T1 is moved off to the left to transfer track 12 under the influence of the transfer locomotive, table T1 keeps limit switch LSA closed while the table is thereover and the brake 55 is thus released permitting the table T1 to be moved.

A successive table movement feature is provided in that as long as car T1 or a table is in position as shown in Fig. 3, the next car T2 as well as the successive next car T3 will not be moved. It will be noted that the power to limit switches LSE and LSF is supplied through conductors 101 and 101' connected to limit switch LSB' which is normally closed if no car is present. However, if a table or car is present, switch LSB' is open and this interrupts the continuity of the common circuit supplying the limit switches LSE and LSF which in turn control motors M2 and M3.

After car T1 has been removed from its position, as shown in Fig. 3, and transferred over to the transfer track 12 by the transfer locomotive (not shown), limit switch LSB' closes and energy is furnished to limit switches LSE and LSF that in turn start their motors M2 and M3 in propelling units 2 and 3 to move the cars T1 and T3 successively forward in a step-by-step manner. This step-by-step successive movement of the cars prevents bumping of the cars and injury thereto, and so also it relieves the necessity of having a full line of tables on the track 10 which is a typical track.

I have shown a typical example of a floor layout of a grinding and polishing plant wherein the transfer track 12 will take the car and move it over to track 13. In the particular example shown, an endless belt 13' drives the cars to the right along track 13 until they reach the propelling unit 3' which is similar to propelling unit 3 on track 10. The same setup for moving the cars to the right along track 13 is thus provided so that the cars are brought to the right-hand end of transfer track 13 where a transfer locomotive (not shown) moves the cars back to starting line position for track 10 at the beginning of the grinding and polishing line. While I have shown an endless belt 13' associated with track 13 extending partway the length of the track, this may be removed and additional power units similar to 1', 2', and 3' may be positioned farther along the track in spaced relation and the cars moved step-by-step to the right-hand transfer track 14 as shown in Fig. 1.

In the system here shown, provision is made when positioning the drive units and the limit switches such that the action of the transfer locomotive to pull cars or tables from track 10 is not hampered. This feature is useful in case of any breakdown of the separate drive unit transfer system. By use of this car or table transfer system a lesser number of cars are needed and at the same time damage to the cars by bumping one another has been eliminated.

I claim as my invention:

1. A grinding and polishing line having a track in the grinding and polishing line having a grinding and polishing portion towards one end, first and second transfer tracks perpendicular respectively to said first mentioned track at the ends thereof, a return track spaced apart from and generally parallel to said first track and having said transfer tracks respectively at each end thereof, cars on said tracks, and a transfer locomotive on each transfer track for transferring cars on the first track to the return track and from the return track to the first track, the improvement comprising individual car drive units spaced along said first track between the grinding and polishing portion thereof and the first transfer track for contacting and propelling each car as it passes thereby only to a subsequent drive unit, the spacing between drive units being greater than the length of a car, control means for each drive unit spaced along said first track for actuation by the cars with each control unit being spaced from the drive unit it controls and the successive drive unit in the direction of the movement of the cars, said drive units being rendered inoperative by the presence of a car at a successive control unit for that drive unit, whereby as cars are moved away from the last of said successive control units, preceding cars are advanced step by step always in spaced apart relation without contacting or butting one another.

2. Apparatus of the character described in claim 1 including a brake unit associated with each drive unit for arresting contact with a car passing thereover when said drive unit associated therewith is not operatively propelling a car.

3. In a glass surfacing operation in which glass to be worked on is carried on cars guided on tracks along a glass grinding and polishing line having a grinding and polishing portion and after leaving the grinding and polishing line the cars are returned on transfer and return track means to said line, the improvement comprising the steps of propelling each car separately without striking or abutting another car along the track by propelling means at a position adjacent the track immediately after leaving said grinding and polishing portion, subsequently retarding the movement of each separate car by retarding means at the end of its path of travel on the track of said grinding and polishing line, and interrupting the operation of said propelling action in response to actuation of means sensing the presence of a car at its location adjacent the retarding means whereby cars are moved in spaced relation step by step without abutting each other.

4. In a glass surfacing operation in which glass to be worked on is carried on cars guided on tracks along a glass grinding and polishing line having a grinding and polishing portion and after leaving the grinding and polishing line the cars are returned on transfer and return track means to said line, the improvement comprising the steps of first propelling each car step by step to a subsequent propelling position by propulsion means immediately after said car leaves the grinding and polishing portion of the grinding and polishing line without abutting or striking another car, subsequently propelling each car step by step by propulsion means at subsequent propelling positions spaced along the track without abutting or striking another car, said propelling operation being interrupted and responsive to sensing means spaced along the track and sensing the presence of a car at a successive position, retarding the movement of each car by retarding means at the end of its travel along the grinding and polishing line track and interrupting the operation of said propelling means and the action thereof in response to the presence of a car at its location of the retardation at the end of the grinding and polishing line whereby cars are moved in spaced relation step by step without abutting each other.

References Cited in the file of this patent

UNITED STATES PATENTS

| | | |
|---|---|---|
| 815,320 | Carpenter | Mar. 13, 1906 |
| 1,431,248 | Norris | Oct. 10, 1922 |
| 1,683,342 | Fox | Sept. 4, 1928 |
| 1,734,065 | Werotte | Nov. 5, 1929 |
| 2,024,728 | Galson | Dec. 17, 1935 |
| 2,041,353 | Kenny et al. | May 19, 1936 |
| 2,133,459 | Livingston | Oct. 18, 1938 |
| 2,144,848 | Miller | Jan. 24, 1939 |
| 2,215,743 | Saurer | Sept. 24, 1940 |
| 2,383,645 | Hahn | Aug. 28, 1945 |
| 2,601,831 | Caillard | July 1, 1952 |
| 2,714,355 | Benson | Aug. 2, 1955 |
| 2,770,434 | McNally | Nov. 13, 1956 |

FOREIGN PATENTS

| | | |
|---|---|---|
| 689,075 | Great Britain | Mar. 18, 1953 |
| 279,410 | Switzerland | Mar. 1, 1952 |